(12) United States Patent
Reiche et al.

(10) Patent No.: US 9,937,417 B2
(45) Date of Patent: Apr. 10, 2018

(54) INTERACTIVE VIDEO GAME WITH DIFFERENT SIZED TOYS HAVING DIFFERENT ABILITIES WITHIN THE VIDEO GAME

(71) Applicants: Paul Reiche, Novato, CA (US); I-Wei Huang, Novato, CA (US)

(72) Inventors: Paul Reiche, Novato, CA (US); I-Wei Huang, Novato, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 1072 days.

(21) Appl. No.: 13/648,937

(22) Filed: Oct. 10, 2012

(65) Prior Publication Data
US 2014/0100029 A1 Apr. 10, 2014

(51) Int. Cl.
*A63F 13/245* (2014.01)
*A63F 13/30* (2014.01)

(52) U.S. Cl.
CPC ............ *A63F 13/12* (2013.01); *A63F 13/245* (2014.09); *A63F 2300/1062* (2013.01); *A63F 2300/302* (2013.01); *A63F 2300/308* (2013.01)

(58) Field of Classification Search
CPC ...................................................... A63F 13/02
See application file for complete search history.

(56) References Cited

U.S. PATENT DOCUMENTS

| | | | |
|---|---|---|---|
| 5,766,077 A * | 6/1998 | Hongo | 463/30 |
| 5,976,018 A * | 11/1999 | Druckman | 463/47 |
| 6,773,325 B1 * | 8/2004 | Mawle et al. | 446/175 |
| 7,081,033 B1 * | 7/2006 | Mawle et al. | 446/175 |
| 8,535,153 B2 * | 9/2013 | Bradbury et al. | 463/31 |
| 2005/0059483 A1 * | 3/2005 | Borge | 463/29 |
| 2006/0003843 A1 * | 1/2006 | Kobayashi et al. | 463/43 |
| 2007/0211047 A1 * | 9/2007 | Doan et al. | 345/419 |
| 2011/0159963 A1 * | 6/2011 | Link | 463/40 |
| 2012/0295702 A1 * | 11/2012 | Otero et al. | 463/31 |
| 2012/0295703 A1 * | 11/2012 | Reiche et al. | 463/31 |
| 2012/0295704 A1 * | 11/2012 | Reiche et al. | 463/31 |

OTHER PUBLICATIONS

Anhut, Anjin, "The Science of Size in Video Games," Dec. 2, 1010, Kotaku, available at http://kotaku.com/5703898/the-science-of-size-in-video-games, last accessed, Nov. 14, 2016.*

* cited by examiner

*Primary Examiner* — Jay Liddle
(74) *Attorney, Agent, or Firm* — Klein, O'Neill & Singh, LLP (57) ABSTRACT

A video game includes a peripheral device that senses the presence and identity of toys near or on the peripheral. Each of the toys includes an identification device such as an RFID tag. Each of the toys is also associated with a corresponding game character or object. The peripheral device provides lighting effects based on characteristics of the game character or aspects of the game play sequence thereby enhancing the user's gameplay experience.

11 Claims, 6 Drawing Sheets

INTERACTIVE VIDEO GAME WITH DIFFERENT SIZED TOYS HAVING DIFFERENT ABILITIES WITHIN THE VIDEO GAME

BACKGROUND OF THE INVENTION

The present invention relates generally to video games and, more particularly, to video games that interact with a variety of physical objects, such as toys, having different sizes.

Video games provide fun and enjoyment for many. Video games allow game players to participate in a variety of simulated activities. Video games allow game players to perform roles and experience activities that the game players may not be able or desire to experience directly, whether due to cost, danger, or equipment concerns, or simply due to a role or activity being a fantasy.

Video games, being generally provided by way of an electronic device and associated display, often lack a physical component by which a player may touch and hold a representative object associated with video game play or otherwise have a physical object representative of video game play. Despite the sometimes intense graphics action of various video games, the game play experience remains two dimensional. Merely interacting with a displayed simulated environment may not allow game players to fully relate to game play, with a sharply distinct separation between a game play world and the world physically inhabited by the game players.

BRIEF SUMMARY OF THE INVENTION

One aspect of the invention provides a video game system comprising a plurality of physical objects, such as a toys having a variety of sizes, and a gaming device in communication with the physical objects, the gaming device including a processor for executing instructions to conduct a game play pattern utilizing a virtual representation of the physical object(s) in communication with the console. Different object sizes have different characteristics and abilities within the video game. For example, a larger toy may have character that is a virtual representation of the toy in the game that is stronger and slower, whereas a smaller toy may have a character that is a virtual representation in the game that is weaker and faster.

Another aspect of the invention provides a video game system, comprising: a first physical object configured for communication with a gaming device; a second physical object configured for communication with said gaming device, wherein said second physical object is significantly larger than said first physical object; said gaming device is configured to execute video game instructions for providing a virtual representation, in the form of first a video game character, of said first physical object and a virtual representation, in the form of a second video game character, said second physical object in connection with the video game character, wherein said virtual representation of said first physical object has attributes different from attributes of said virtual representation of said second physical object based on an indication of respective size of said first physical object and said second physical object.

Another aspect of the invention provides computer readable non-transitory medium storing program instructions for execution by a computer, the program instructions including program instructions for: receiving information indicative of relative size of a toy figure; commanding display of a game character representative of the toy figure in a virtual world; determining if a requested action for the game character is possible based on the information indicative of relative size of the toy; and commanding display of performance of the requested action by the game character if the requested action is determined to be possible based on the information indicative of relative size of the toy.

Another aspect of the invention provides a game system, comprising: a first plurality of toys in a first size range, each toy of the first plurality of toys including memory storing information relevant to a video game character associated with the toy, the information including information indicative of size of the toy; a second plurality of toys in a second size range, each toy of the second plurality of toys including memory storing information relevant to a video game character associated with the toy, the information including information indicative of size of the toy; and a gaming device configured by program instructions to receive the information relevant to video game characters, to provide for game play in which a one of the video game characters associated with a one of the toys interacts with a virtual world, with abilities of the one of the video game characters associated with the one of the toy dependent on the information indicative of the size of the toy.

These and other aspects of the invention are more fully comprehended upon review of this disclosure.

DETAILED DESCRIPTION

Figure 1A:
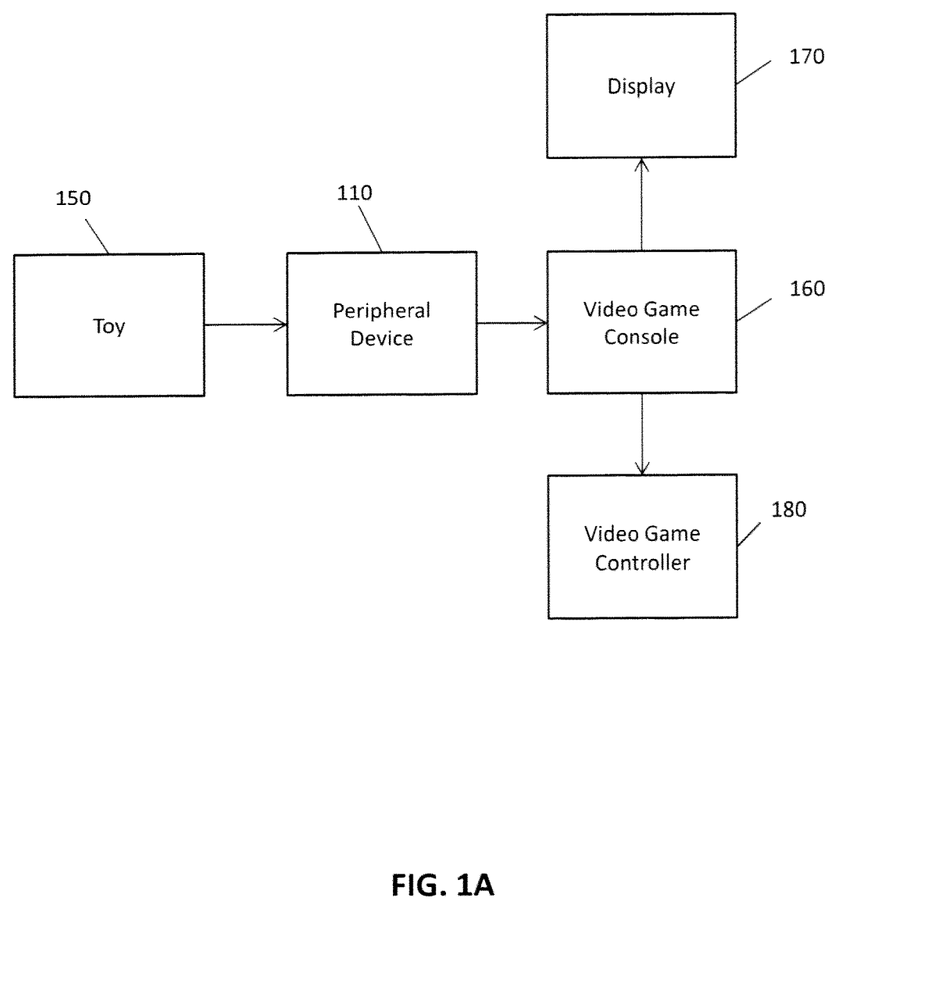
FIG. 1A is a block diagram illustrating an example of a video game system in accordance with aspects of the present invention.

FIG. 1A is a block diagram illustrating an example of a video game system in accordance with aspects of the present invention. Referring to FIG. 1, the video game system includes a video game console 160 with a processor for executing program instructions providing for game play and associated circuitry, a video game controller 180, a display device 170 and a peripheral device 110. In the embodiment depicted in FIG. 1A, the peripheral device 110 facilitates communication between toy 150 and video game console 160. In alternative embodiments, toy 150 may communicate with video game console directly without the need for a peripheral. In further alternative embodiments, the video game console 160 may be different gaming devices, such as a computer, a mobile device, a tablet or a portable gaming device. In still further embodiments, the video game controller 180 and display device 170 may be separate or incorporated into the gaming device.

Figure 1B:
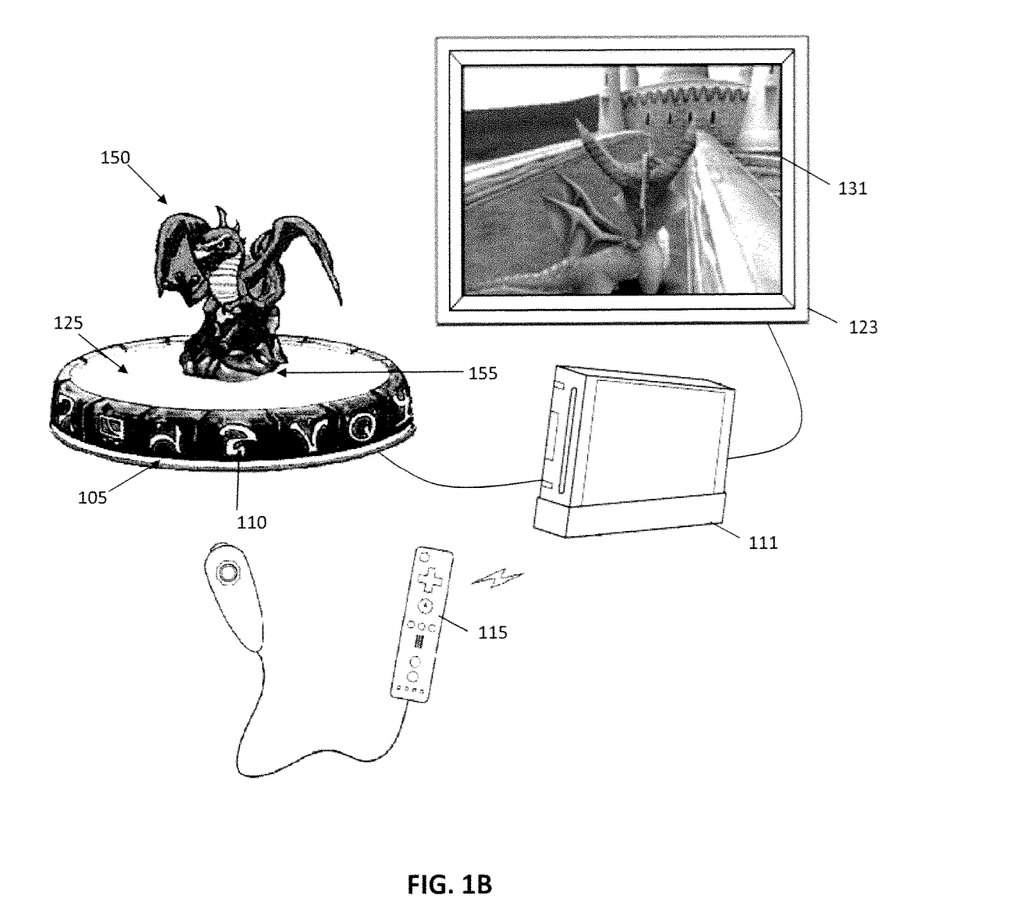
FIG. 1B illustrates an example of a video game system in accordance with aspects of the invention.

FIG. 1B illustrates an example of a video game system in accordance with aspects of the invention. The video game system includes a game console 111 with a processor for executing program instructions providing for game play and associated circuitry, user input devices such as a game controller 115, a display device 123, and a peripheral device 105, which in various embodiments includes the capability to emit light. The peripheral device may also provide the capability to read and write information to a toy 150 figure. The processor, responsive to inputs from the user input devices and the peripheral device, generally commands display on the display device of game characters in and interacting with a virtual world of game play and possibly each other. In addition, the processor, responsive to inputs from the peripheral device, may be used to add characters and objects to the virtual world, with the characters able to manipulate the added objects and move about the virtual world. For example, the processor may include characters in game play based on inputs from the peripheral device, and the processor may control actions and activities of game characters based on inputs from the user input devices.

The instructions providing for game play are generally stored on removable media, for example, an optical disk, in a memory location for the gaming device, or in a remote server. The game console may include an optical drive, for example, a DVD-ROM drive, for reading the instructions for game play. In some embodiments, the game console may be a personal computer, mobile device or other known gaming devices including similar internal circuitry as herein described, as well as, for example, a built-in display and built-in user input devices, such as a keyboard and a touch pad.

The display device is generally coupled to the game console by a cable, although in some embodiments a wireless connection may be used. In many embodiments, the display device is a liquid crystal display. In some embodiments, the display device is a television. A display screen 131 of the display device displays video images of game play, generally as commanded by the processor or other associated circuitry of the game console. In the embodiment of FIG. 1B, the display screen shows a screen shot of video game play. As illustrated, the screen shot shows a display of a character, generally controlled by and animated in accordance with user inputs, approaching an inanimate item in the form of what may be considered a castle.

The peripheral device, in some embodiments and as shown in FIG. 1B, has a substantially flat upper surface for placement of toys thereon. The peripheral may be used to provide information from the toy to a game console and, in some embodiments, from the game console to the toy. Accordingly, the peripheral may include a universal serial bus (USB) interface, some other wired interface or a wireless interface for communication with the game console. The information communicated between the peripheral and the game console may be encrypted, and the information read from or written to the toy by the peripheral may also be encrypted. The peripheral may also include a radio-frequency interface to communicate with toys. In many embodiments, the radio-frequency interface is an RFID interface. In other embodiments, the peripheral may include a different interface for communicating with toys, such as an optical interface or a wired interface. For example, the toy and the peripheral device may utilize LEDs and photodiodes for communication, or the peripheral device may include an image sensor, for example, a CCD, to read information of a toy, or the toy and the peripheral device may have wireless communication circuitry of various types, for example those used in wireless networking.

In many embodiments the peripheral includes a controller. The controller generally includes a programmable device such as a microprocessor performing program instructions. The program instructions may be stored in the peripheral as firmware or downloaded from the game console. The controller communicates with the game console and with the toy, with the controller communicating with the toy responsive to the peripheral device receiving signals from the toy or as commanded by the game console. For example, the controller may receive commands to determine what toys are present on the peripheral or to read from or write to a particular toy. In other embodiments, the controller may independently communicate with the toy, for example using a radio-frequency interface, and supply resulting information to a game console over a USB interface. For example, the controller may, via the radio-frequency interface, regularly detect what toys are newly present on the peripheral device and report the detected toys to the game console via the USB interface.

The game player generally places game toys, for example, object 150 in the form and representative of a dragon as shown in FIG. 1B, on the flat surface of the peripheral device during game play. The toy object is generally in the form of and representative of a game item such as a game character or other game item. In most embodiments, the toy is associated with a game character during game play.

Figure 2:
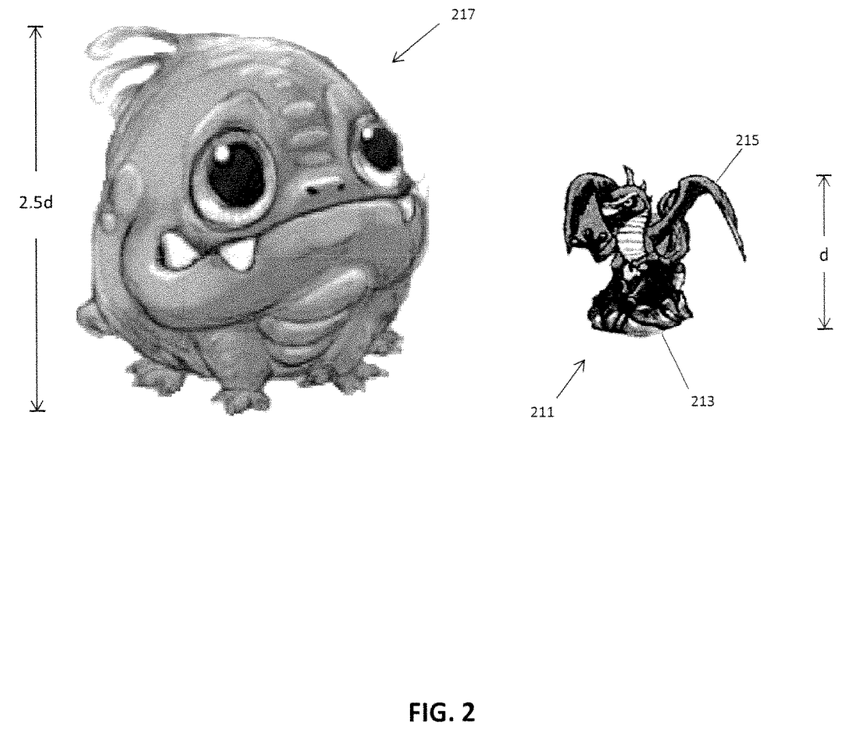
FIG. 2 illustrates toy objects of different sizes in accordance with embodiments of the invention.

FIG. 2 illustrates two toy objects, or toys, or differing sizes, in accordance with embodiments of the invention. As shown in FIG. 2, a first toy object 211 includes a base 213 and a toy figure 215, and a second toy object 217 in the form of a toy figure, without a base. Each toy includes machine-readable information, for example, memory, a radio frequency identification (RFID) tag or a barcode. The machine-readable information may be sensed, read, and/or in some embodiments written, by a peripheral device, in some embodiments indirectly by way of sending data and commands to the toy to write the data to memory of the toy. The machine-readable information may include a numeric identifier. The machine-readable information allows the peripheral device, or a processor of the game console, to distinguish one toy from other toys, and the machine-readable information may therefore be considered to include a toy identifier, and in some embodiments, each particular toy has its own distinct identifier. In addition, in many embodiments the machine readable information includes additional information about a corresponding game character, including in some embodiments, status of the game character in a game, including abilities or ability levels of the game character. In various embodiments the machine readable information is in a portion of the toy object expected or intended to be positioned near the top surface of the peripheral device. For example, for a toy object which is to be placed on a top surface of the peripheral device of FIG. 1B, the machine readable information may be placed in the base of the toy object.

When a toy is read by the peripheral device, the peripheral device provides the game console an indication of the identifier and status information of the toy, and generally the processor of the game console commands display of a corresponding game character or otherwise makes the corresponding game character available in game play. Thus, video game play may be affected by use of real world objects, objects which may also be utilized for play and/or observation separate from video game play.

As illustrated in FIG. 2, the second toy is larger than the first toy. As shown in FIG. 2, the first toy has a height d and the second toy has a height 2.5 d, with the second toy two and one half times the height of the first toy. The second toy is therefore significantly larger than the first toy in at least one dimension. In some embodiments a toy is significantly larger than another toy if the toy is between 1.5 times and 15 times larger than the other toy by at least one measure. In some embodiments the toy is significantly larger than the other toy if the toy is between 2 times and 5 times larger than the other toy in at least one dimension. In some embodiments the toy is significantly larger than the other toy if the toy is between 2 times and 3 times larger than the other toy in at least one dimension. In some embodiments the dimension is height. In some embodiments the dimension is volume. In some embodiments the dimension is width.

The memory of the toy stores information indicative of the relative size of the toy. In some embodiments the information is directly indicative of relative size of the toy, for example a memory location storing a flag indicating that the toy is a smaller toy or a larger toy. In some embodiments the information is indirectly indicative of relative size of the toy. For example, memory of the toy may store an indication of a character identification, with some characters being associated with smaller toys and some characters being associated with larger toys. Accordingly, the system may allow for use of varying sized toys while providing a representation of that to in the video game. The relative size of the toy may impact the characteristics of the virtual representation of the toy in the video game. For example, a relatively small toy may provide a character in the video game that is fast, but has relatively less strength, whereas a larger toy may provide a character in the video game that has relatively greater strength, but is relatively slower than a small character. Other corresponding characteristics of characters within the video game may be provided based on the respective shape and size of the toys.

For example, in some embodiments a plurality of toys may be used with or as part of the game systems of FIG. 1A or 1B. A first set of the plurality of toys may be in a first size range, for example a "small" size range, and a second set of the plurality of toys may be in a second size range, for example a "large" size range. In some embodiments, for each toy, memory of the toy stores an indication of size of the toy. In some embodiments, memory of toys of one size, for example large toys, stores an indication of size of the toy, while the lack of storage of such an indication in other toys indicates the other toys are small toys.

Figure 3:
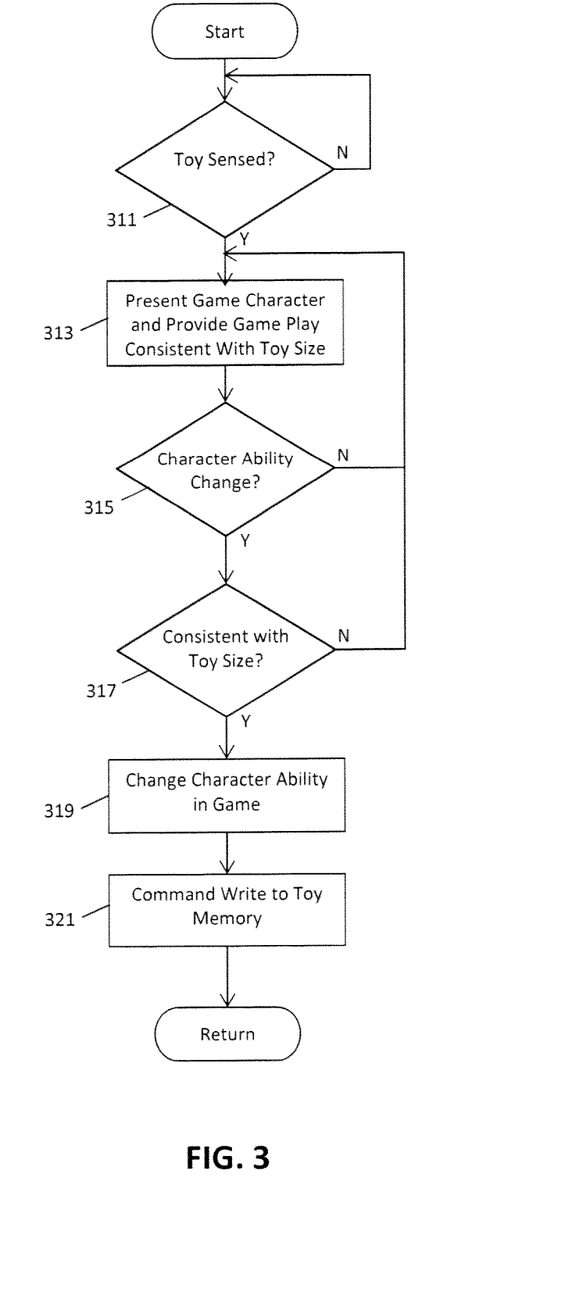
FIG. 3 is a flowchart of a process for providing game play with size dependence conditions in accordance with aspects of the invention.

FIG. 3 is a flowchart of a process providing for game play and writing to toy memory in accordance with aspects of the invention. In some embodiments the process is performed by the system of FIG. 1A or 1B, and in some embodiments the process is performed by a processor of such systems, for example in accordance with program instructions stored in memory, which may be non-transitory, even if rewritable.

In block 311 the process determines if presence of a toy is sensed. The toy may be as discussed with respect to FIG. 1A,B or 2, for example, and may include memory and communication capabilities. The toy may be sensed using a peripheral device, or the toy may be sensed by way of direct communication with elements of a game console.

If presence of a toy is sensed, in block 313 the process reads information of the toy, commands display of or displays a game character representative of the toy in a virtual world of video game play, and provides for game play based on user inputs in which the game character interacts with the virtual world. In many embodiments information of the toy includes information indicative of relative size of the toy. For example, in some embodiments a toy may be in any one of a plurality of predefined size ranges, and information of the toy is indicative of the size range which includes the toy. For example, in some embodiments the memory of the toy stores a value or has a field storing a value indicative of whether the toy is a small toy or a large toy, for example in embodiments in which a toy would be in one of the size ranges "small" or "large." In some embodiments the value is directly indicative of the size range which includes the toy. In some embodiments the value is a value indirectly indicative of the size range; for example the value may indicate either a specific toy or a generic toy, with the game console including information to determine toy size based on the value.

In many embodiments abilities of the game character in game play are dependent on information from the memory of the toy and results of game play. For example, information from the memory of toy may indicate levels of strength, speed, or other abilities of the game character, and results of game actions or events may change those levels. In some embodiments at least a predefined level of strength may be required to perform some game actions, for example lifting a boulder or breaking down a door. In some such embodiments only a larger toy may have sufficient strength to accomplish these tasks, or similar tasks. In some embodiments at least a predefined level of speed may be required to outrun another character, or run around another character, or achieve passage past a moving obstacle. In some such embodiments, only a smaller character may have sufficient speed to perform such tasks, or similar tasks.

In block 315 the process determines if the game character has a change in abilities due to game play actions or events. If so the process continues to block 317, otherwise the process continues with providing game play in block 313.

In block 317 the process determines if the change in character ability is consistent with size of the character. For example, in some embodiments a character may have an increase or decrease in strength, resulting from some game action or event. In such embodiments an increase in strength of a "small" character may be restricted to less than some predefined level or magnitude. Similarly, an increase in speed for a "large" character may be restricted to less than some predefined level or magnitude. Further, in some embodiments one or all such levels of character abilities may also be restricted from decreasing below a predefined level or magnitude. For example, a larger character may always be restricted to having at least a predefined level or magnitude of strength. Thus, the process proceeds to block 319 if the change in level of the ability of the character is consistent with game play. Otherwise the process returns to block 313 and continues to provide game play.

In block 319 the process changes the ability of the game character during game play. In some embodiments a change in ability of the game character is only for a duration of a presently playing game. In such instances, the process may thereafter return. In some embodiments a change in ability of the game character is persistent, and the process proceeds to block 321. In some embodiments the change in ability of the game character may or may not be consistent, depending on conditions. For example, in some embodiments a temporary change in game character ability may depend on a game state. In some embodiments a temporary change in game character ability may relate to the change in ability being outside the bounds checked in block 317, but allowed for temporary purposes (with operations of block 317 being modified to allow such changes).

In block 321 the process commands a write memory of information indicative of the change in ability of the game character.

The process thereafter returns.

Figure 4:
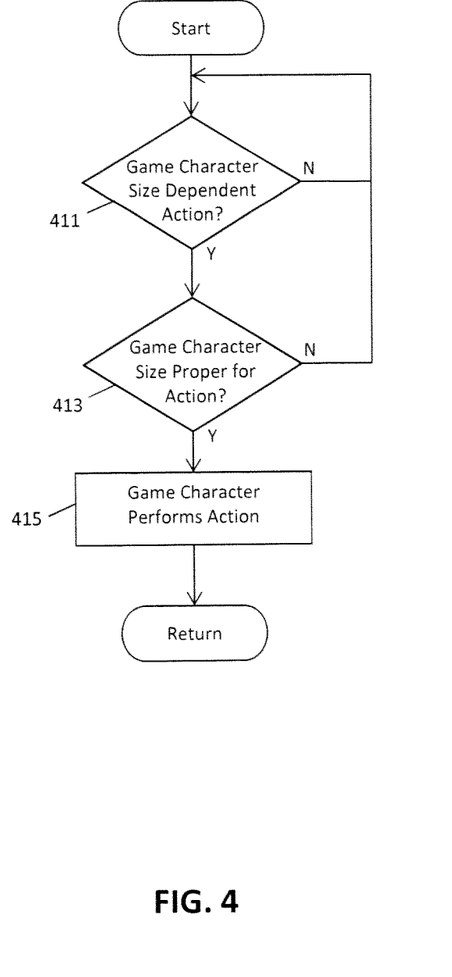
FIG. 4 is a flowchart of a process for performing game actions in accordance with aspects of the invention.

FIG. 4 is a flow diagram of a process for performing game actions in accordance with aspects of the invention. In some embodiments the process is performed by the system of FIG. 1A or 1B, and in some embodiments the process is performed by a processor of such systems, for example in accordance with program instructions stored in memory, which may be non-transitory, even if rewritable.

In block 411 the process determines if a requested action for a game character is a size dependent action. In some embodiments a size dependent action is an action that may be performed by only certain sized game characters, namely characters representative of toy figures of a certain size or set of sizes. For example, in some embodiments game characters representative of larger toy figures may be able to break down a door, while characters representative of smaller toy figures may not be able to do so. If the character requested action is a size dependent action, the process continues to block 413.

In block 413 the process determines if the requested action for the game character is possible for the size of the game character. If so, the process proceeds to block 415, in which the requested action is performed, with performance of the action by the game character displayed or commented to be displayed. The process thereafter returns.

Figure 5:
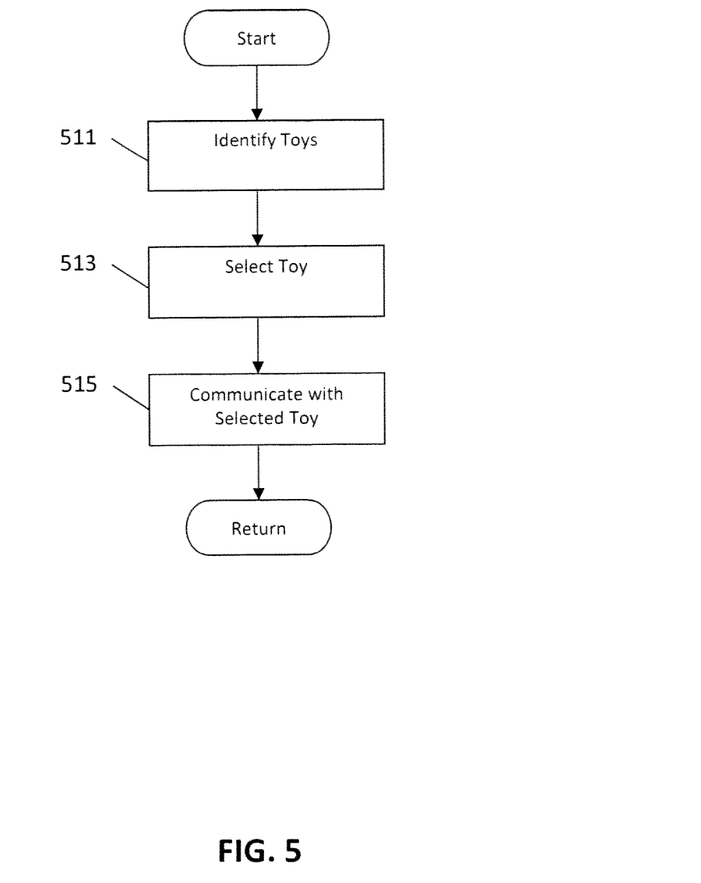
FIG. 5 is a flowchart of a process for communication with toys in accordance with aspects of the invention.

FIG. 5 is a flowchart of a process for communication with toys in accordance with aspects of the invention. The process may be implemented by a video game peripheral, a video game console, or a combination of devices. Additionally, the process may be implemented using a processor configured by program instructions. The process may be performed utilizing a standardized protocol, for example, the ISO/IEC 14443 standard for Identification Cards. Accordingly, the process may communicate with toys via radiofrequency communication.

In block 511, the process identifies toys in a defined region. For example, toys on the surface of a video game peripheral. In various embodiments, the toys may be identified by RFID, barcodes, or optical recognition. In one embodiment, identification of toys includes a video game peripheral reading identifiers of the toys and supplying the identifiers to a video game console.

In block 513, the process selects a toy for communication. The process may select the toy by transmitting a selection command having an identifier matching the identifier of the toy. In many embodiments, the process expects to receive an acknowledgment of the selection from the toy. When an acknowledgment is not received, the process may retransmit the selection command or may signal a video game associated with the process that the selected toy is not available.

In block 515, the process communicates with the selected toy. For example, the process may read from a particular memory location of the toy or may write to a particular memory location of the toy. In many embodiments, the process expects to receive an acknowledgment or response from the toy, and when not received, the process may retransmit the command or may signal the video game associated with the process that the selected toy is not available. The process thereafter returns.

Although the invention has been discussed with respect to various embodiments, it should be recognized that the invention comprises the novel and non-obvious claims supported by this disclosure.

What is claimed is:

1. A video game system, comprising:
   a first physical object configured for communication with a gaming device;
   a second physical object configured for communication with said gaming device, wherein said second physical object is significantly larger than said first physical object;
   said gaming device is configured to execute video game instructions for providing a virtual representation, in the form of a first video game character, of said first physical object and a virtual representation, in the form of a second video game character, said second physical object in connection with the video game character, wherein said virtual representation of said first physical object has attributes different from attributes of said virtual representation of said second physical object based on an indication of respective size of said first physical object and said second physical object,
   wherein the first physical object includes a first memory storing the indication of respective size of the first physical object and the second physical object includes a second memory storing the indication of respective size of the second physical object, and wherein the indication of respective size of the first physical object and the indication of respective size of the second physical object each comprises a flag indicating whether the respective size is in a first size range or a second size range.

2. The system of claim 1 wherein said virtual representation of said first physical object is capable of moving with greater speed within the video game environment than said virtual representation of said second physical object.

3. The system of claim 1 wherein said virtual representation of said second physical object has greater strength within the video game environment than said virtual representation of said first physical object.

4. The system of claim 1, wherein the second physical object has a dimension at least twice as great as the dimension of the first physical object.

5. The system of claim 4, wherein the dimension is height.

6. The system of claim 5, wherein the second physical object has a height no greater than three times the height of the first physical object.

7. Computer readable non-transitory medium storing program instructions for execution by a computer, the program instructions including program instructions for:
   receiving information indicative of relative size of a toy figure;
   commanding display of a game character representative of the toy figure in a virtual world;
   determining if a requested action for the game character is possible based on the information indicative of relative size of the toy; and
   commanding display of performance of the requested action by the game character if the requested action is determined to be possible based on the information indicative of relative size of the toy;
   wherein the information indicative of relative size of the toy figure is a flag indicating a larger toy figure or a smaller toy figure.

8. A game system, comprising:
   a first plurality of toys in a first size range, each toy of the first plurality of toys including memory storing information relevant to a video game character associated with the toy, the information including information indicative of size of the toy;
   a second plurality of toys in a second size range, the second size range consisting of sizes greater than sizes of the first size range, each toy of the second plurality of toys including memory storing information relevant to a video game character associated with the toy, the information including information indicative of size of the toy; and a gaming device configured by program instructions to receive the information relevant to video game characters, to provide for game play in which a one of the video game characters associated with a one of the toys in the first or second size range interacts with a virtual world with abilities of the one of the video game characters associated with the information indicative of the size of the one of the toy in the first or second size range;

wherein the information indicative of size of the toy comprises a flag indicating whether the toy is in the first size range or the second size range.

9. The game system of claim 8, wherein the second size range is between 1.5 and 4 times larger than the first size range in at least one measure.

10. The game system of claim 9, wherein the measure is height.

11. The game system of claim 8, wherein the abilities comprise speed and strength.

\* \* \* \* \*